June 8, 1965   B. H. HUMPHERYS   3,188,629
DECODER-READOUT AND DEGARBLER
Filed Jan. 30, 1962   4 Sheets-Sheet 1

INVENTOR.
BERNARR H. HUMPHERYS
BY
ATTORNEYS

INVENTOR.
BERNARR H. HUMPHERYS

INVENTOR
BERNARR H. HUMPHERYS
BY
Roy Miller
ATTORNEYS

June 8, 1965  B. H. HUMPHERYS  3,188,629
DECODER-READOUT AND DEGARBLER
Filed Jan. 30, 1962  4 Sheets-Sheet 4

INVENTOR.
BERNARR H. HUMPHERYS
BY

ATTORNEYS

United States Patent Office 3,188,629
Patented June 8, 1965

3,188,629
DECODER-READOUT AND DEGARBLER
Bernarr H. Humpherys, Escondido, Calif., assignor to the United States of America as represented by the Secretary of the Navy
Filed Jan. 30, 1962, Ser. No. 169,976
10 Claims. (Cl. 343—6.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a selective identification system and more particularly, to an active decoder-readout for use in the selective identification feature modification of the IFF Mark X system thereby enabling fast accurate data acquisition in air traffic control.

Due to the introduction of high-speed jet aircraft there is an increased necessity for fast, accurate data acquisition in air traffic control. Until recently, communications in primary radar were adequate to this end. This necessity led to the development of a Selective Identification Feature modification to the IFF Mark X System.

During the development of the Selective Identification Feature modification to the IFF Mark X system, consideration was given to several decoding techniques and methods of presentation. Among the decoding techniques were the delay line as used in the development of the AN/UPA-24 decoder group, and a special cathode ray tube disclosed in Patent Number 2,981,861, to W. R. Dawirs. The presentation methods were, respectively, a single pulse presented on the PPI as the result of a reply train decode, and a visual numerical presentation of the reply train code.

The AN/UPA-24 had been developed to meet the operational requirement for a passive decoder providing a "where are you" answer to an IFF challenge. It operates by producing an output pulse for a received coded pulse train which matches a preset code, and presenting the resulting decoded signal on a PPI.

Operationally, the "who are you" type of decode and display offers considerable merit, especially in traffic-control applications. This type of operation presents a code readout to all challenge replies and requires more complex equipment to accomplish the result.

Development of the multiple deflection target tube lead to the development of a code sorter printer tube which is the subject matter of Patent No. 2,999,178, and ultimately to an Air Traffic Control Aircraft Identification Unit (ATCAIU).

Simultaneously with the ATCAIU development, a simple electromechanical readout was developed but was not continued as no operational requirement came into being.

In using and analyzing the ATCAIU it was found that some means of suppressing "garbled" SIF reply signals was necessary. A garble occurs when two or more transpondor replies are so time-spaced that the intelligence pulses of the separate reply trains generate multiple 20.3 microsecond framing pulse intervals. The ATCAIU decoder cannot discern which framing group brackets the legitimate code; consequently all code combinations of the "garble" are displayed. The passive UPA-24 decoders are not as subject to erroneous readout with garbled SIF replies since the equipment accepts only a preselected code and rejects all others. There is no assurance, however, that a "garble" will not contain one or more combinations of the preset code. Subsequently a "degarbler" circuit was developed and incorporated in the ATCAIU for further evaluation.

Further study showed that an electronic readout device could be designed to provide visual decode information of multiple targets, include a "degarbler" feature, and accommodate the 4096 reply combinations available on mode 2 SIF. The visual display would be on small, gas-filled, cold-cathode, ten-digit numerical indicator tubes placed physically close to the PPI while the associated decoding equipment could be placed at some remote point. Through the use of such equipment various advantages would be obtained over the ATCAIU among which are: use of standard commercially available components, choice of several types and sizes of display units, compact display panel that may be located at any convenient position independent of the decoding equipment, the fact that it is not limited to 64 codes, and ability to retain the readout display until it is manually or automatically reset.

An object of the present invention is to provide equipment which enables rapid identification of high-speed aircraft, and of aircraft in areas of high aircraft density.

A further object of the invention is to provide a selective identification system which uses commercially available components.

An additional object of the invention is to provide a selective identification system wherein the readout has large display digits and a compact display panel located at any convenient position independent of the decoding equipment.

Another object of the invention is to provide a selective identification system that is not limited to 64 codes and has the ability to retain readout display until it is manually or automatically reset.

A further object of the invention is to provide an active readout using standard, commercially available components having greater flexibility and faster response than electromechanical versions.

Another object of the invention is to provide an active readout which incorporates means for suppressing garbled SIF reply signals.

Various other objects and advantages will appear from the following description of one embodiment of the invention, and the novel features will be particularly pointed out hereinafter in connection with the appended claims.

In order to better describe and understand the present invention reference is made to the following drawings wherein.

Figure 1:
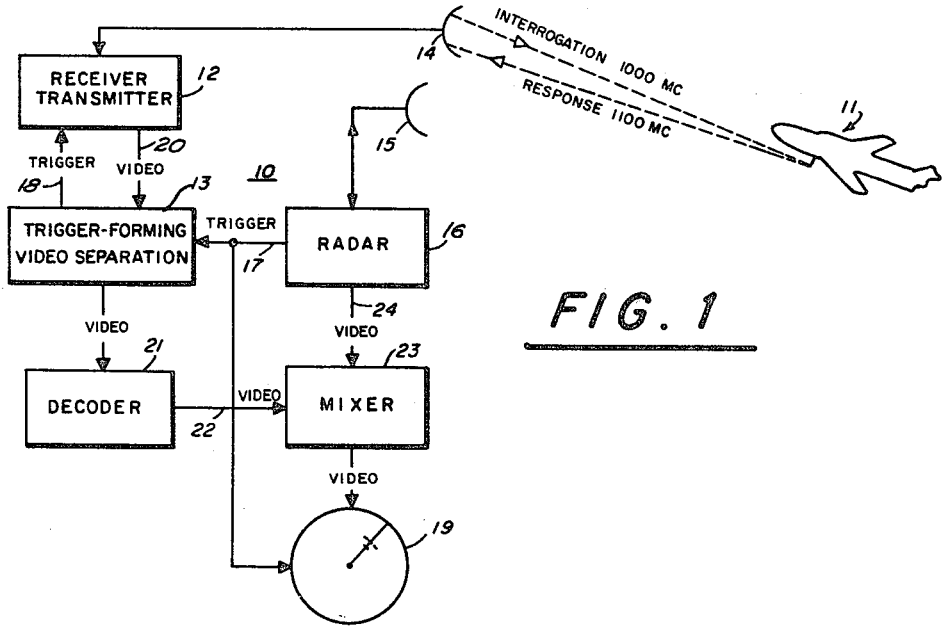
FIG. 1 is a simplified block diagram of the entire system illustrating the interrogation and response of an object in space.

In order to understand the readouts and the signals they have to work from, reference is made to FIG. 1 wherein the entire system is shown, which comprises a special purpose low-power radar incorporating an interrogator-responsor 10 at surface installations and a cooperating radar beacon called a transponder in aircraft installations 11. The interrogator-responsor equipment 10 comprises a receiver transmitter 12 and a block labelled trigger forming and video separation 13, the function of which will be explained subsequently.

In order to properly associate the radar echo and the identifying signal in azimuth, an IFF antenna 14 is usually mounted on top of and rotates with a radar antenna 15. Range coordination is obtained by triggering the IFF and radar simultaneously. The needed triggers are obtained from a conventional radar equipment 16 on line 17. The trigger is introduced into the trigger forming and video separation block 13 and coupled on line 18 to the receiver transmitter 12. The trigger on line 17 is also used to coordinate the sweep on a cathode-ray display scope 19 which forms part of the conventional radar equipment.

The interrogation response is received on antenna 14 and coupled to receiver transmitter 12 and then through line 20 to the trigger forming and video separation block 13 and thence to a decoder 21 where the response is decoded and the resultant video coupled on line 22 as one input to a mixer 23. Another input to mixer 23 comprises the normal video output from radar system 16 which is coupled on line 24 from the output of the radar set 16 to the mixer 23. The resultant mixed video from mixer 23 is coupled into the PPI 19 for display.

In the operation of the system as stated previously, range coordination is obtained by triggering the IFF and radar simultaneously. Therefore, a trigger on line 17 is used to start the transmitter in receiver transmitter block 12 and an interrogation signal is transmitted from antenna 14 to a transponder in the aircraft 11. The interrogation consists of double 1-microsecond pulses spaced a few microseconds apart on a radio frequency near 1000 megacycles and simultaneously with the radar pulse from radar equipment 16. The particular pulse spacing, when recognized in the transponder receiver of the aircraft, automatically triggers the transponder transmitter in its characteristic multiple-pulse response near 1100 megacycles which is received on antenna 14 in the surface installation coordinated with the radar echo from the same aircraft. That is to say, the response is received in receiver transmitter 12 and coupled via line 20 to the trigger forming and video separation block 13. The video is coupled into decoder 21 where it is decoded and then mixed with the radar video in mixer 23.

The response received on antenna 14 is a binary train in which the start and stop pulses are 20.3 microseconds apart and always present for synchronizing purposes. Half-microsecond pulses at each of the interior information positions may be present or absent to form $2^{12}$ or 4096 codes. All information positions are spaced by 1.45 microseconds, the center position being unused.

For ease in processing, the twelve information positions are divided into four groups of three positions each, called the A, B, C, and D groups, the subscript numbers indicating the binary weight of each position. Since each group contains three binary positions, eight combinations are possible within each group, resulting in an octanary presentation, 0 through 7. Thus, if all twelve informations are actuated, the A, B, C and D groups would each add up to seven and the code would be indicated as 7777.

For the purposes of illustrating the present invention only the A and B codes will be dealt with in that the others are identical and therefore repetitious. For the purposes of illustrating the function of the apparatus let it be assumed that a director wishes to vector a particular aircraft to the interception of another aircraft. There is a prior knowledge of "who" the vectored aircraft is, consequently, that aircraft's assigned code. What the director needs to know is "where" his aircraft is located on a cluttered scope. This is provided to the director by the decoder equipment in block 21 of FIG. 1. The major component of the decoder 21 is a delay line whose overall length and 1.45 microsecond output taps exactly match the characteristics of the aircraft response signal. Code dials permit presetting each tap for the expected presence or absence of a pulse to correspond with the code signal from the aircraft. A spurious pulse or a missing pulse at any tap is sufficient to inhibit the multi-pulse coincidence of the signal in the delay line. The single pulse output from the decoder 21 thus indicates to the director "where" the transponder is which is transmitting the prearranged signal. Such an equipment is often called a "passive" type of decoder because it simply monitors signals until one arrives which it can accept.

Figure 2:
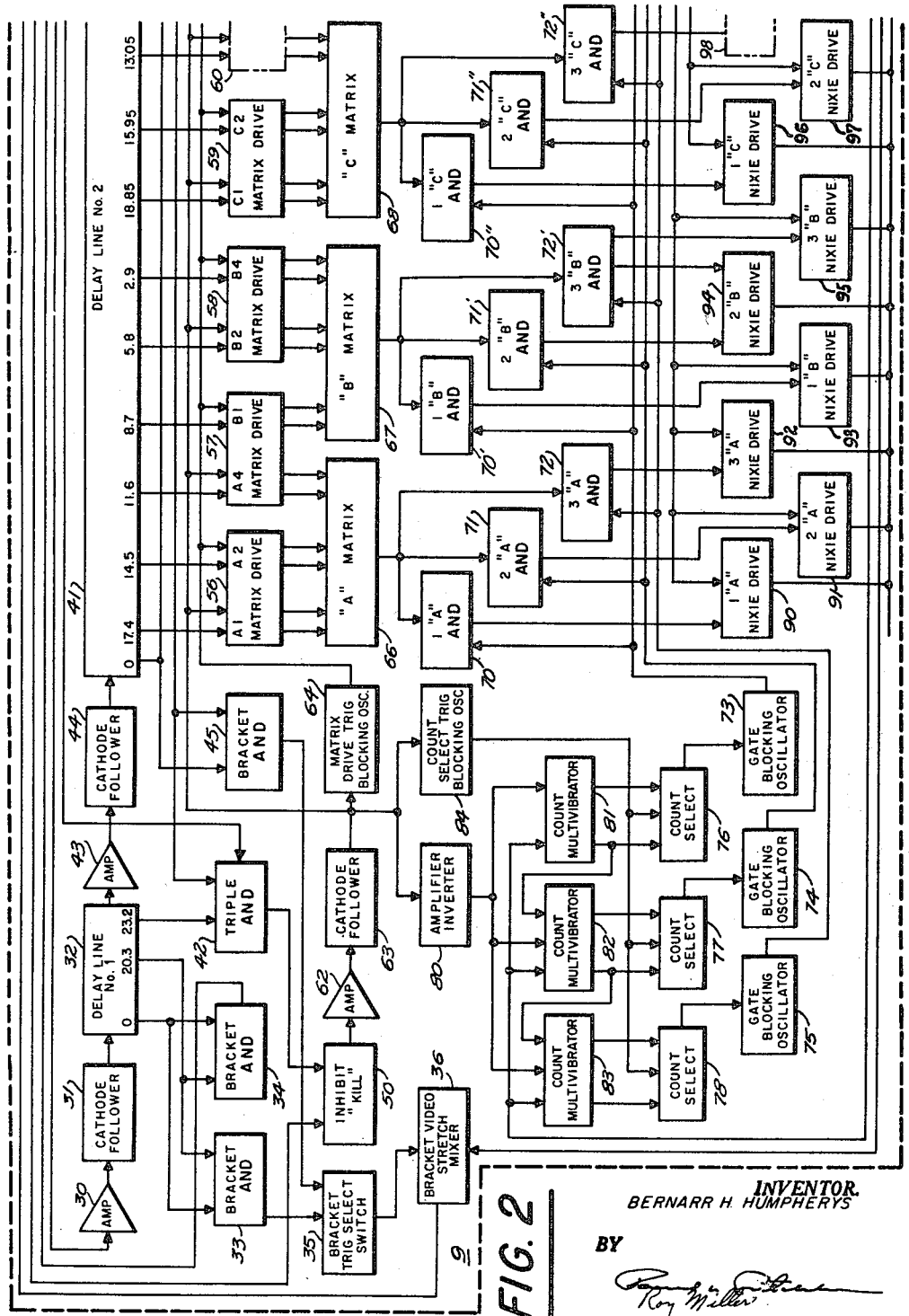
FIGS. 2 and 2a illustrate an overall block diagram of the decoder-readout.
Figure 2A:
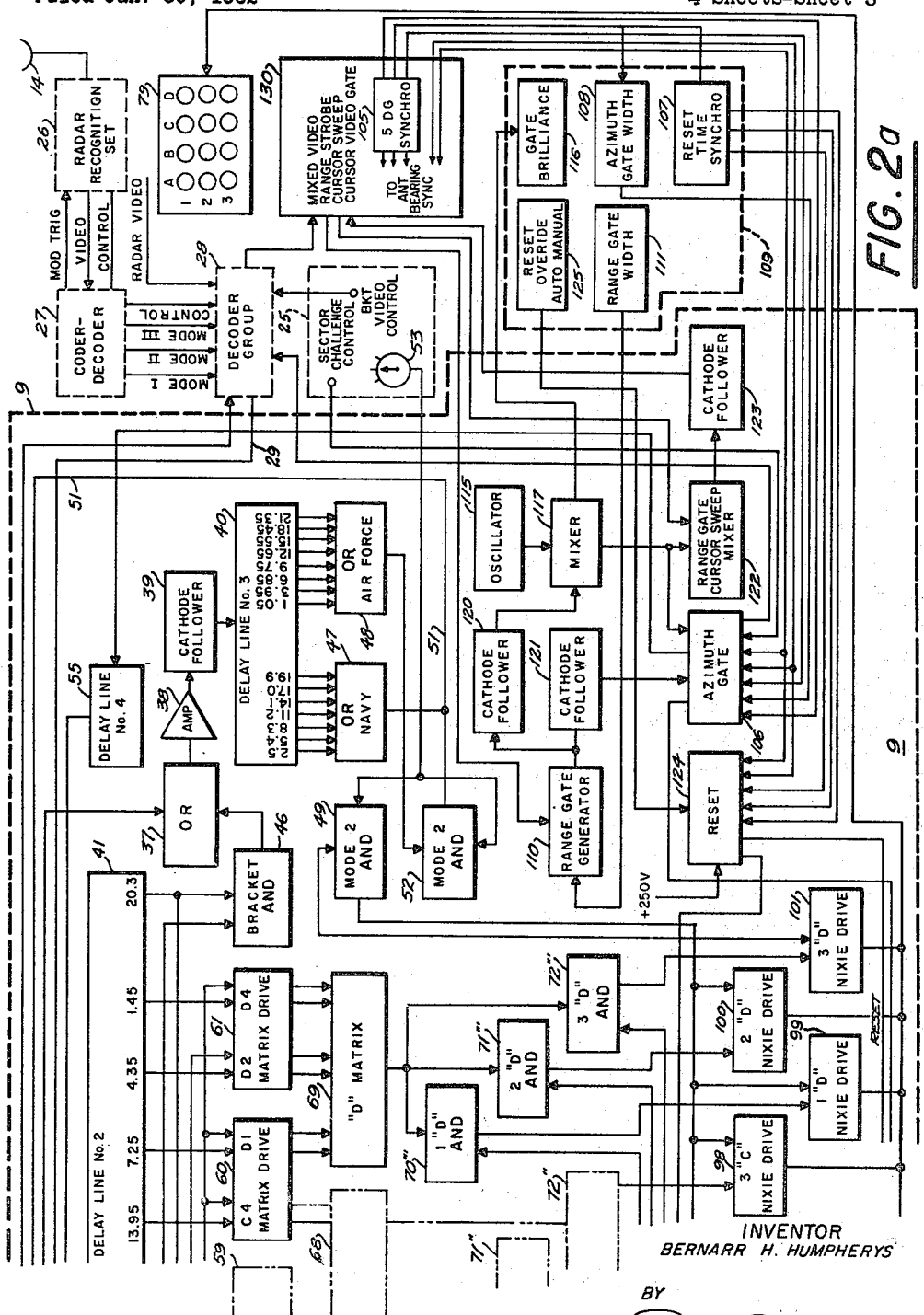

In other types of operation, such as the surveillance of newly appearing targets, there is no prior knowledge of the codes transmitted. Here, "who" are you information is needed which would require a time consuming attempt to match the decoder dials to the known configuration of the transmitted code. Thus, a new type of decoder is needed which will display directly for readout the code number of any response from a transponder. This type is frequently called an "active" decoder. Such a decoder readout is illustrated in FIGS. 2 and 2a.

Much of the peripheral equipment in the SIF system outside of the decoder readout comprises existing equipment such as the antenna 14, a radar recognition set AN/UPX-1 26, a coder-decoder KY61/UPX-1 27, a modified passive decoder KY80/UPA-24 28, a modified control element C-1008/UPA-24 29, and a modified AN/SPA-8A 130. The modified equipments will be explained subsequently. The modified AN/UPA-24 decoder 28 provides the mode selected video input signal to a decoder readout 9 on line 29. The mode selected video is amplified in an amplifier 30 and coupled through cathode follower 31 to delay line 32. Output taps at 0 and 20.3 microsecond on delay line 32 supply two AND or coincidence circuits 33 and 34, respectively, such that when an incoming SIF signal exactly fills and matches the delay line 32 a signal occurs at each of the AND outputs. The output of AND gate 33 is coupled to a bracket trigger select switch 35 and thence to a bracket video stretch mixer 36.

The output of AND gate 34 passes through an OR gate 37, is amplified in amplifier 38 and coupled through cathode follower 39 to delay line 40. It should be noted at this time that delay lines 32, 40 and 41 constitute the major components of the "degarbler" circuitry where segments of time before, during and after the incoming signals are examined for the presence of interference that could cause "garble" as a legitimate coded signal and ultimately suppress a readout.

Referring back to delay line 32, the signals appearing at the 23.2 microsecond delay tap are supplied to two circuits, one a triple coincidence circuit 42 and the other an input to an amplifier 43. The output of amplifier 43 is coupled through a cathode follower 44 to delay line 41.

Delay line 41 and its subsequent circuits provide the decoding functions to the input signal and will be described subsequently. Zero and 20.3 microsecond delay taps on delay line 41 are connected to two bracket AND circuits 45 and 46 and the 20.3 microsecond tap also provides a second input to the triple AND circuit 42. The output of the bracket AND circuit 45 provides a second input to the bracket trigger select switch 35. Thus, the choice of bracket decode from either delay line 32 or delay 41 can be made at switch 35 for an ultimate PPI presentation. The output of bracket AND circuit 46 passes through the OR gate 37 and is amplified in amplifier 38 and coupled through cathode follower 39 to the delay line 40. As can be seen, the output of bracket decode 46 is delayed 23.2 microseconds with respect to the output of bracket decode 34. This provides an inhibit pulse when two trains are spaced 20.3 microseconds apart from stop to start pulse.

Figure 4:
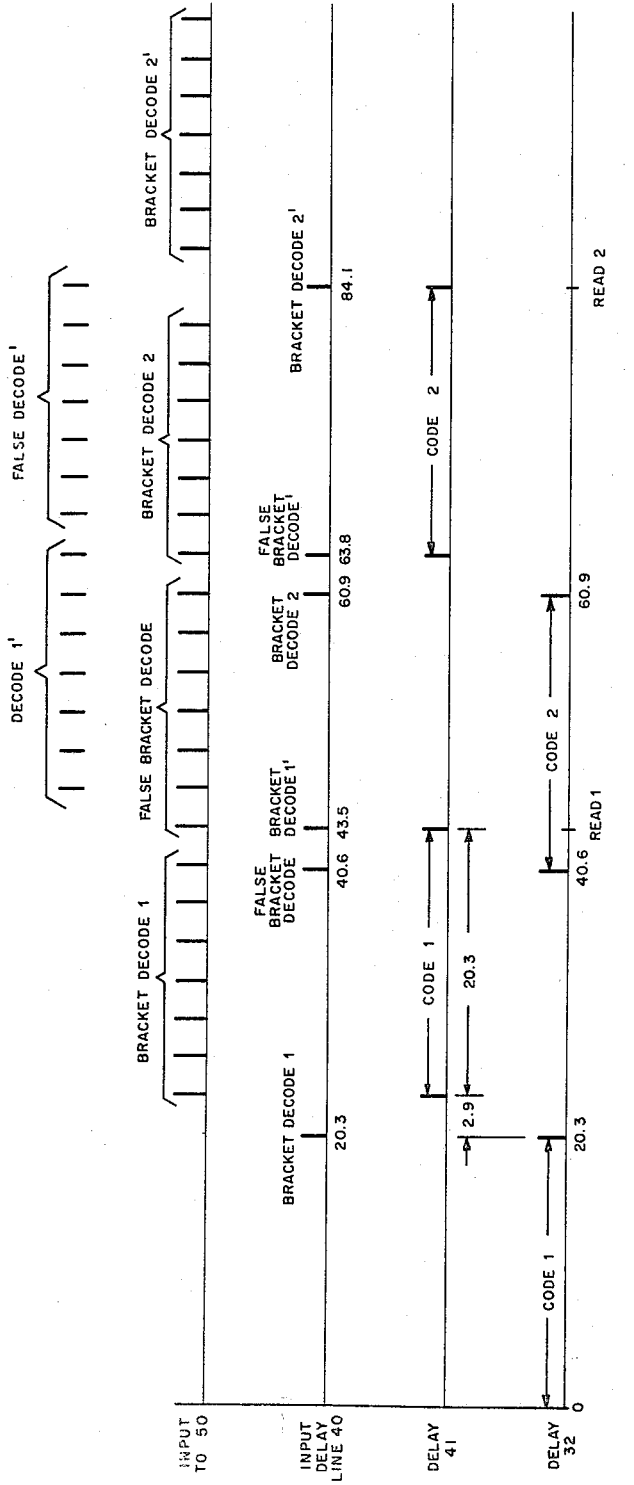
FIG. 4 illustrates a degarbler sequence for pulse coded trains spaced 20.3 microseconds apart.

This situation is illustrated in FIG. 4 wherein two codes, codes 1 and 2, are shown. Only the start and stop pulses are shown in that this is all that is needed to illustrate the operation of the degarbler circuitry. Code 1 is loaded into delay line 32 at 0 time and extends for 20.3 microseconds, i.e., the space between the start and stop pulse is 20.3 microseconds. 20.3 microseconds after this, code 2 enters delay line 32 and extends to the 60.9 microsecond position. The two codes, codes 1 and 2, are shown on the line labeled "delay 32" of FIG. 4.

2.9 microseconds afterward the respective code enters delay line 41 as shown on the line marked "delay 41" of FIG. 4. Again, there is a 20.3 microsecond interval between start and stop pulses of the respective codes and between the stop pulse of code 1 and the start pulse of code 2.

The bracket decodes from AND gates 34 and 46 are indicated on the line labeled "input delay line 40" of FIG. 4. These bracket decodes would occur at 20.3 and 43.5 microseconds for code 1 and 1¹. The bracket decodes for code 2 and 2¹ would occur at 60.9 microseconds and 84.1 microseconds. There would be a false bracket decode at 40.6 microseconds and at 63.8 microseconds. There are six bracket decodes in that each code is bracket decoded twice, i.e., the codes are bracket decoded in delay 32 and delay line 41. The bracket decodes from AND gate 34 and AND gate 46 are coupled to OR gate 37 through amplifier 38 and cathode follower 39 to delay line 40. The taps on delay line 40 are shown as numbering seven for the Navy embodiment, i.e., the ones labeled 2.5, 5.4, etc., up to 19.9.

For the purposes of illustrating FIG. 4, the first tap is taken as being at 2.9 microseconds rather than 2.5. The tap is actually taken in practice at 2.5 to provide a slight "pre-knock" so that the inhibit pulse provided brackets the decode pulse applied to triple AND gate 42. However, as stated, for the purpose of illustration the first tap is taken at 2.9 microseconds after the input pulse.

Therefore, as shown in FIG. 4 on the base line labeled "input to 50," the output from the switch 52 will comprise six groups of pulses which are shown separated vertically. First will occur seven pulses corresponding to the loading of bracket decode 1 into delay line 40; then will occur seven pulses for the false bracket decode; then seven pulses for the bracket decode 2; then seven pulses for the bracket decode 2¹. Overlapping the pulse groups would be seven pulses from decode 1¹ and the false decode ¹. All of the pulses shown on the line labeled "input to 50" are coupled to the inhibit kill circuit.

As shown in FIG. 2, another input to the inhibit kill circuit is the output of the triple AND gate and as previously explained the output of the triple AND gate comprises clock pulses which, in the absence of an inhibit pulse, are coupled through to the matrix trigger blocking oscillators in block 64. One input to triple AND gate 42 comprises the bracket decode pulses from the delay line 41 therefore, the bracket decode pulses which are primed on the line labeled "input delay line 40" would be coupled to the triple AND gate 42. These would occur at 43.5 microseconds, 63.8 microseconds and 84.1 microseconds. However, at those instants of time there are inhibit pulses being coupled to the inhibit kill circuit 50 from the switch 52 which originated at delay line 40. Thus, the first pulse labeled "false" on the line labeled "input to 50" would kill the bracket decode pulse 1¹; the first pulse of the set of seven labeled "code 2¹" and the last pulse of the group of seven labeled "false prime" would kill the false ¹ bracket decode 2¹ respectively.

Thus, in the instance of a situation where two trains spaced 20.3 microseconds apart enter the delay lines the bracket decode pulses for the two trains, i.e., codes 1 and 2, are eliminated as well as the false bracket decodes. This is done in that it is thought better to reject good codes rather than attempt to decode false trains.

Delay line 40 is provided with 15 output taps spaced at 1.45 microsecond delay intervals. The first tap occurs at 1.05 microseconds rather than the conventional 1.45 microseconds in order to compensate for circuit delays. The outputs from delay line 40 are collected in two OR circuits 47 and 48 which are designated Navy and Air Force respectively. The Navy groups are spaced at 2.90 microsecond delay intervals and the Air Force are interleaved at the intermediate 1.45 microsecond delay intervals, however, still spaced at 2.90 microsecond intervals. The output of the Air Force OR group of block 48 is mixed with the Navy OR group from block 47 via a mode 2 AND relay 52 when a mode selection switch 53 on control box 25 is set to mode 2 position. The outputs of delay line 40 are collected and supplied to an inhibit or "kill" stage 50 via line 51 in the case of the Navy group. The Air Force group from block 48 is coupled through the mode 2 AND relay 52 and thence to the inhibit or "kill" stage 50.

It can be seen from examination of the circuitry thus far described that a single ungarbled SIF input signal will be bracket pulse decoded at the delay lines 32 and 41, both of which in turn drive the third delay line 40 which generates two sets of inhibiting or "killer" pulse trains. Timing of these inhibiting pulses is such that none are present the instant the non-garbled signal is decoded in delay line 41. If one of these pulses is present at the input to the inhibit stage 50, clock pulse outputs therefrom are inhibited, hence preventing further decoding action in later stages.

Delay line 41 is provided with twelve taps at 1.45 microsecond spacing, except the center 10.15 microsecond position, plus the zero input and 20.3 microsecond output, bracket positions. The signals appearing at the twelve taps are processed in groups of three and each tap position is assigned a letter and number indicating the group and its octal equivalent value, in accordance with the standard SIF code numbering procedure. Since the decoding process is identical for each group, only the "A" group will be described.

Serial binary signals of an SIF train are converted to parallel binary in delay line 41, hence if all the "A" group pulses of an SIF signal are present they will appear at the 17.4, 14.5 and 11.6 microsecond taps simultaneously when the complete train has fully entered the line. At this same instant, the start-stop pulses of the signal train are coincidized in the triple AND circuit 42 to provide a clock pulse to signify the decode time. The clock pulse output from 42 is coupled to the inhibit stage 50 and passes therethrough in the absence of an inhibit pulse from switch 52. The third input to the triple AND circuit 42 is a variable length gate from the output of a delay line 55. The source and function of this signal from delay line 55 will be described subsequently.

The outputs from delay line 41 are supplied to matrix drive circuits 56 through 61. The "A" group taps of delay 41 are supplied to matrix drive circuits 56 and 57 along with the clock signals from the inhibit stage 50. The output of the inhibit stage is coupled through amplifier 62 and cathode follower 63 and comprises one input to each of the matrix drive circuits 56 through 61. The output of cathode follower 63 is also coupled to the input of a matrix drive trigger blocking oscillator 64 whose output is also coupled to the inputs of matrix drive circuits 56 through 61. The matrix drive circuits function somewhat similarly to a multivibrator producing an output on one of two leads. In the absence of a signal at the associated delay line tap on 41 during the clock or decoded interval, a high impedance appears at the left lead of each of the pairs of output leads on the matrix drive output. In that the discussion of the operation is limited to the "A" matrix this would correspond to the two pairs of output leads from matrix drive circuit 56 and the left pair of output leads from the matrix drive 57. With a signal present at the delay tap at decode time, a high impedance appears at the right output lead of each pair of leads corresponding to the "A" matrix. The six leads from the "A" matrix drive circuits provide either a high or low impedance input for an "A" 3 x 8 diode matrix 66. In the system there are four 3 x 8 matrices, i.e., matrices 66 through 69. In the example chosen where all "A" group pulses are present, a high impedance will appear on the eighth output lead representing the digit 7 of the "A" matrix 66. The output from each of the matrices comprises eight leads, however, for the purposes of illustration the eight leads are shown as a single wire. In the example, when all "A" group pulses are absent, the high impedances of the matrix drives will appear on the left of each pair of matrix drive output terminals and the resultant high impedance at the matrix output 66 would appear on line 1 representing digit 0.

The eight matrix output leads from each of the matrices 66 through 69 are parallel fed to three AND circuits 70 through 72 for the case of the "A" group pulses. The AND gates corresponding to the "B," "C" and "D" group pulses are 70'–72', 70"–72", and 70'''–72''', respectively. Each of the AND circuits corresponding to 70–72 comprise 16 diodes. The gating signals for the AND circuits 70–72 are obtained from gate blocking oscillators 73, 74 and 75, respectively. The gate blocking oscillators 73–75 in turn, derive their respective inputs from count select circuits 76–78. The purpose of the three selectors is to channel sequentially the decoded matrix output from 66 to one of three display units in a "Nixie" display 79. The count select circuitry contained within the count select stages 76–78 is triggered by a trigger from cathode follower 63.

Initially, a single clock pulse is coupled from cathode follower 63 through an amplifier inverter 80 to count multivibrators 81, 82 and 83 and simultaneously triggers gate blocking oscillator 73. The input trigger to gate blocking oscillator 73 is derived from the cathode follower 63 through a count select trigger blocking oscillator 84 the output of which is coupled through count select circuit 76 to the input of gate blocking oscillator 73. The output of the gate blocking oscillator 73 thus enables "one" AND circuits 70, 70', 70" and 70'''. Thus, decoded signals would be generated in the matrix AND circuits 70–72 etc. and then channeled to "one" group "Nixie" drive stages 90, 93, 96 and 99, then to "Nixie" row number 1 in the "Nixie" display 79 thereby displaying the first complete code.

A second clocking pulse trips count multivibrator 82 and simultaneously triggers gate blocking oscillator 74 via count select trigger blocking oscillator 84 and count select circuit 77, thereby providing a gate pulse for the "two" group AND circuits 71, 71', 71" and 71'''. The decoded signal from a second SIF train is thus channeled to "two" group "Nixie" drive stages 91, 94, 97 and 100. Similarly a third clocking pulse from cathode follower 63 triggers count multivibrator 83 and channels the decoded signal to "three" group "Nixie" drive stages 92, 95, 98 and 101. Any further clocking pulses have no effect on the count multivibrator circuits 81–83 until they are reset. The previously described counting circuitry comprises in effect a target selector means so that more than one return, i.e., up to three, may be displayed simultaneously in case of multiple targets and as a redundant check for a single target.

The "Nixie" drive stages 90–101 include subminiature thyratrons that provide enabling voltage and memory for the "Nixie" cold cathode display tubes contained within the "Nixie" display 79. Once a decoded signal trips a drive thyratron it remains conducting until reset.

In order to chose a particular SIF response for decoding and readout display, it is necessary to provide a range-azimuth gate that can be manually positioned on the target area. Since the AN/SPA–8A indicators are available and in widespread use this type was chosen for modification and development of the necessary range-azimuth gating circuitry. The existing azimuth cursor and range strobe positioning hand cranks are utilized to provide the manual positioning of the range-azimuth gate. A 5DG synchro 105 is added in space available at the bottom of the azimuth cursor control shaft with input electrical signals supplied from the existing antenna bearing synchro. Output signals are supplied to an azimuth gate generator circuit 106 in the main unit of the readout 9 and to a 1DG synchro reset time control 107. When the antenna bearing synchro signals electrically coincide with the manually positioned azimuth cursor the resultant output is at peak value and triggers a relay, not shown, in the azimuth gate generator 106. Width of the azimuth gate is determined by the triggering level of 106 which is adjustable by the azimuth gate width potentiometer 108 in the range-azimuth control box 109.

Range information is obtained from existing range strobe circuitry with the SPA–8A indicator 130 and is used to trigger a range gate generator 110. The length of the range gate is determined by setting of a range gate width control 111 in the range azimuth control box 109. The output of range gate generator 110 is coupled through a cathode follower 121 to an input of the relay in the azimuth gate circuitry 106. Therefore, the resultant output of the relay in the azimuth gate circuitry 106 is a range-azimuth gate and is coupled to delay line 55 where it is delayed 20.3 microseconds before being coincidized with the triple AND circuit 42 associated with the bracket taps on delay line 41. The purpose of delay line 55 is to compensate for the delay of delay line 32 in order that the PPI presentation and readout decoding occur at the correct time. This delay is necessary only when the system is operated in parallel with a UPA–24 passive decoder.

In order to provide a distinct non-blooming PPI display of the range-azimuth gated area a 750 kc. oscillator 115 is used to modulate the range gate signal and brilliance control 116 is also provided. The 750 kc. output and the output from the brilliance control 116 are mixed in a mixer stage 117. The modulated range gate output of the mixer stage 117 is then coupled to the bracket video mixed stretcher 36 through the azimuth gating circuitry and relay contained within azimuth gate circuitry 106 to provide range-azimuth video to the PPI video sweep.

Range information is coupled from existing range strobe circuitry in the AN/SPA–8A 130 through the range gate generator 110 and thence through a pair of cathode followers 120 and 121 to the mixer 117 and the azimuth gate 106, respectively. Another output from mixer 117 is also coupled to a range gate cursor sweep mixer circuit 122. A cursor video gate is coupled from the AN/SPA–8 122 to an input of the range gate cursor sweep mixer 122 and the output of 122 is coupled through cathode follower 123 as a cursor video gate which is supplied to the AN/SPA–8A to provide a range-gated video cursor sweep. When a target area has been selected by means of the range-azimuth hand cranks of the SPA–8A and the antenna has swept the target and the reply signals decoded and displayed, the visual readout will remain until automatically cleared or reset. The time between readout and reset is determined by the rotor positioning of the 1DG synchro 107 in the control box 109 with relation to the antenna rotational rate. The output of the 1DG synchro is phase-delayed with respect to the antenna bearing synchro signal and triggers reset circuitry and relay 124. Contacts on a relay, not shown, contained within the reset circuitry 124 interrupt the high voltage supply to the "Nixie" drive stages 90–101 and thus blanks the display 79 and also supplies a bias to reset the count multivibrator circuits 81 through 83. A three position switch 125 is provided in the range azimuth control box 109 to select automatic resetting, to permit reset override of this automatic reset feature thus holding the indication indefinitely, or to permit immediate manual resetting.

Figure 3:
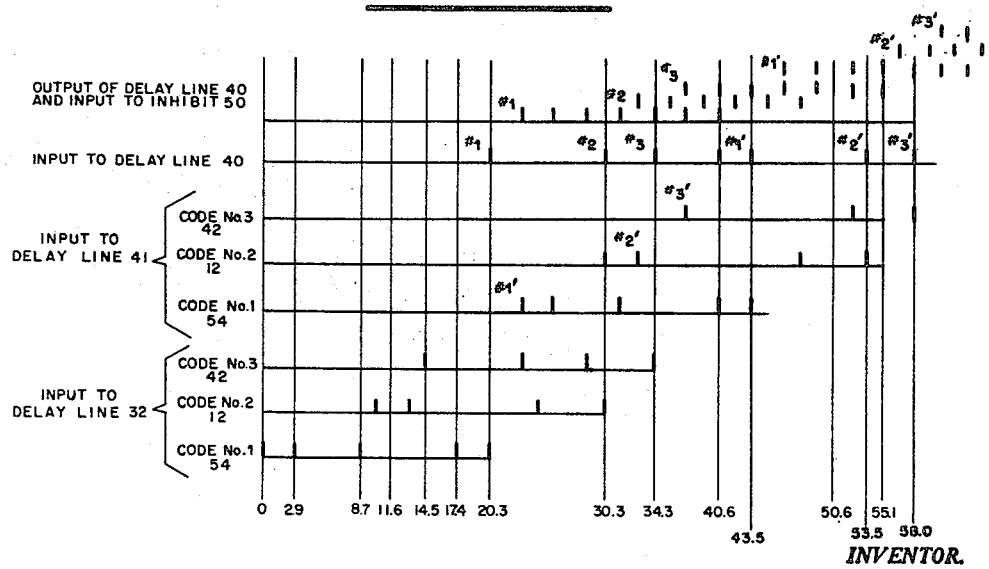
FIG. 3 illustrates an idealized pulse degarbler sequence for garbled and interleaved signals.

FIG. 3 illustrates the operation of the inhibit circuitry 50 and shows three responses being received corresponding to code #1, code #2 and code #3 with the corresponding octal equivalent directly below. The three codes are shown separated vertically in order that the pictorial representation may be made more clear. The output from delay line 40 illustrates that codes 1 and 3 would produce a "garble" and, therefore, inhibit the clock pulses which are generated in the triple AND circuit 42 thereby preventing readout at 43.5 and 58.0 microseconds which would correspond to the normal readout of code #1 and code #3.

This is accomplished as follows: The spacing of codes 1, 2 and 3 in delay line 32 would occur as shown. 2.9 microseconds after the start pulse of code 1 at the 20.3 microsecond tap on delay line 32, the pulse would be present in delay line 40.

For the purposes of differentiating between the various lines the codes are given a prime subscript when they appear in delay line 41. The codes are bracket decoded in delay line 32 and delay line 41 and therefore the input to delay line 40 appears as shown on the line labeled "input to delay line 40." There will be a bracket decode pulse at 20.3 microseconds, 30.3 microseconds, 34.8 microseconds, 43.5 microseconds, 53.5 microseconds and 58 microseconds. The read bracket decode would correspond to the pulses labeled "$1^1$, $2^1$ and $3^1$."

The output of delay line 40 and thus that appearing at switch 52 and the input to the killer grid 50 would appear as a series of seven pulses for each bracket decode pulse. The individual series of seven pulses are shown stacked vertically in FIG. 3 over the base line labeled "output of delay line 40 and input to inhibit 50." Ordinarily there would be a bracket decode and a readout pulse at 43.5, 53.5 and 58 microseconds as indicated on the base line wherein these positions are labeled "read #1, read #2 and read #3." However, one of the pulses at the output of delay line 40 falls in the same time interval as the read pulse for #1 and the read pulse for #3. This can be seen by reading vertically over read #1 and read #3 wherein it is shown that one of the killer pulses from code 3 and one of the killer pulses from code $1^1$ will appear at the input to the inhibit kill circuit 50 simultaneously with the bracket decode pulses $1^1$ and $3^1$ from delay line 41. This will inhibit the output of circuit 50 and therefore no output will be coupled through the amplifier and cathode follower 63 to the matrix drive trigger blocking oscillator 64.

Through the use of the three display rows in the "Nixie" display 79 a dual function is provided; the decode from a single target is displayed three times as the result of three successive interrogations thereby providing the operator of the system of greater assurance of non-interference and hence, a more reliable decode, and they display the decoded signals up to three targets appearing within the selected area and range sequence as a result of a single interrogation.

Thus, a selective identification feature modification of the Mark X IFF system is provided which supplies rapid and reliable visual identification of SIF code responses.

In addition, a system is provided enabling active decoding and readout which uses standard commercially available components and provides a physically large display, a more compact display panel that may be located at any convenient position independent of the decoding equipment and is not limited to 64 codes. In addition, the "Nixie" display has the ability to contain the readout display until it is manually or automatically reset Obviously many modifications and variations of the present invention are possible in the light of the above teachings. It is therefore to be understood that within the scope of the appended claims the invention may be practiced otherwise than as described.

What is claimed is:

1. A selective identification system comprising: interrogation means for interrogating an object in space; receiving means for receiving coded identification signals from said interrogated object in space; decoder means operatively connected to said receiver means for decoding said input signal to determine the identity of the interrogated object in space; degarbler means operatively connected to said decoder means and said receiver means for examining a time interval preceding and following said received identification signal to prevent garbling of said received identification signal from the interrogated object in space; display means operatively connected to said decoder means for providing a digital display of said received identification signal; and target selector means operatively connected to said decoder means and said display means for routing decoded identification signals to said display means.

2. A selective identification system as set forth in claim 1 wherein: said received identification signal from said interrogated object in space comprises a coded pulse train having start and stop pulses bracketing said coded train and wherein said decoder means comprises a delay line operatively connected to said receiver means, said delay line having output taps thereon corresponding to start and stop taps and taps therebetween corresponding to coded pulse time interval positions.

3. A selective identification system as set forth in claim 2 wherein: said degarbler means comprises a first delay line operatively connected to said receiver means and having output taps thereon, one of said output taps being operatively connected to said decoder delay line, another of said output taps being operatively connected to another delay line; said another delay line having a multiplicity of output taps thereon; summing means operatively connected to said output taps on said another delay line for summing the outputs from said another delay line, said summing means having an output therefrom; coincidizing means operatively connected to an output tap on said first delay line and to an output tap on said decoder delay line for producing an output pulse when outputs from said first delay line and said decoder delay line are coincident therein; inhibit means having inputs and outputs, one of said inputs connected to the output of said coincidizing means another of said inputs connected to the output of said summing means said inhibit means producing an inhibit pulse when the output of said coincidizing means and the output of said summing means are coincident in the input thereof.

4. A selective identification system as set forth in claim 3 wherein the output of said degarbler coincidizing means corresponds to a clock pulse, said clock pulse being operatively connected to said matrix drive means through said inhibit circuit so that when an inhibit signal is present in the input to said inhibit circuit the output from the matrix drive means will be inhibited.

5. A selective identification system as set forth in claim 2 wherein said decoder means further comprises: matrix drive means having inputs and outputs, some of said inputs operatively connected to selected taps on said decoder delay line; matrix means having inputs and outputs and having selected inputs connected to outputs on said matrix drive means for coincidizing certain of said outputs from said matrix drive means; signal coincidizing means having inputs and outputs and having selected inputs connected to the outputs of said matrix means, another of said inputs to said signal coincidizing means being operatively connected to said target selector means, an output pulse being produced on the outputs from said signal coincidizing means when appropriate signals from said matrix means and said target selector means are coincident therein; said outputs from said signal coincidizing means being operatively connected to said display means.

6. A selective identification system as set forth in claim 5 and further including: amplifier means operatively connected to the output of said inhibit means through which said clock pulse is coupled to an input to said matrix drive means; said output from said amplifier means also being coupled to said target selector means; said target selector means comprising: count selecting means having inputs and outputs therefrom, said outputs corresponding to range intervals, the outputs from said count select means being coupled to the inputs to said signal coincidizing means so that multiple targets at multiple ranges may be displayed on said display device means simultaneously.

7. A selective identification system as set forth in claim 1 wherein said display means comprises a multiple deflection cathode ray tube.

8. A selective identification system as set forth in claim 1 wherein said display means comprises: numerical indicator tubes of a gas-filled cold cathode type.

9. A selective identification system as set forth in claim 1 and further including range gating means operatively connected to the input to said degarbler coincidizing means for producing an enabling pulse for said degarbler coincidizing means corresponding to a desired range gate to be examined.

10. A selective identification system as set forth in claim 1 and further including: azimuth gate pulse generator means for generating an azimuth gate pulse; mixer means operatively connected to said range gate generator means and said azimuth gate generator means for mixing said range and azimuth pulses and producing an output pulse corresponding to range and azimuth information, said range and azimuth pulse being coupled to said degarbler coincidizing means for determining the range-azimuth of the area in space to be interrogated.

References Cited by the Examiner

UNITED STATES PATENTS 3,058,104  10/62  Garfinkel et al. _____ 343—6.5

KATHLEEN H. CLAFFY, *Primary Examiner.*

CHESTER L. JUSTUS, *Examiner.*